Patented Oct. 5, 1926.

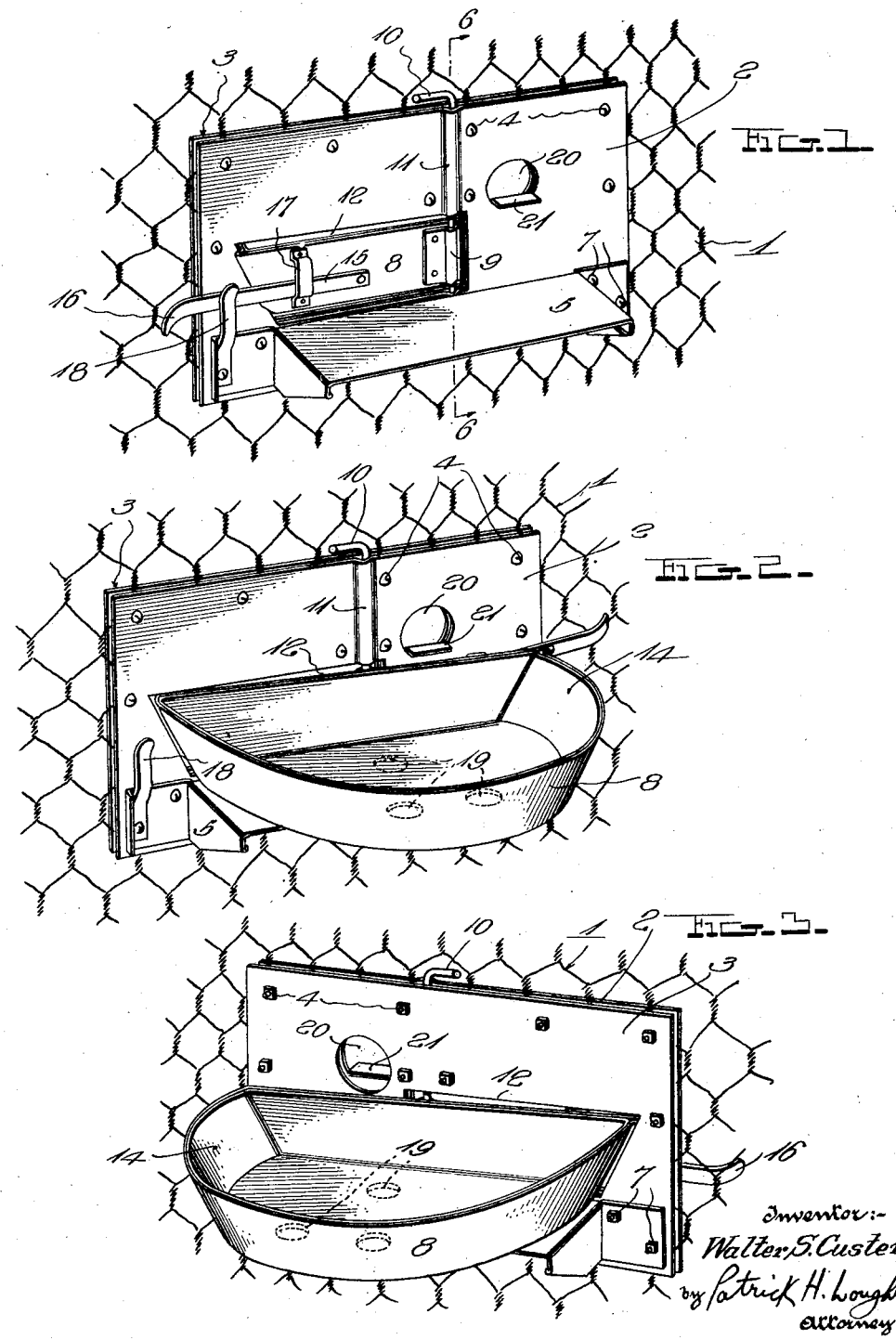

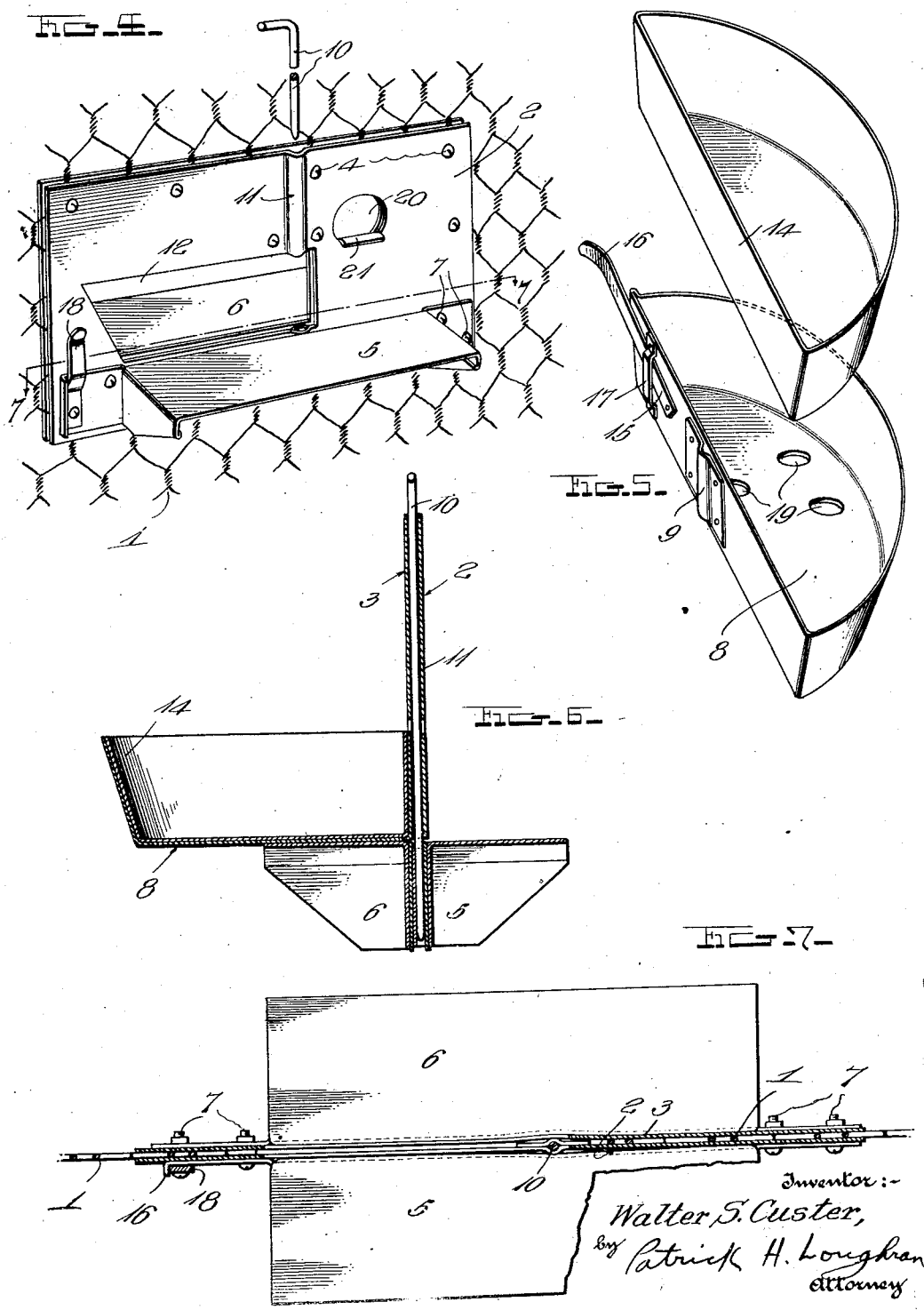

1,602,000

UNITED STATES PATENT OFFICE.

WALTER S. CUSTER, OF MISSOULA, MONTANA.

FEEDER AND WATERER FOR BIRDS AND ANIMALS.

Application filed March 1, 1926. Serial No. 91,477.

My invention relates broadly to feed troughs for birds and animals, and more particularly to a construction of feed trough for attachment to an enclosure in which birds or animals may be housed.

One of the objects of my invention is to provide a feeder for birds and animals which is readily accessible for filling and cleaning, and which may be inexpensively manufactured on a quantity production scale.

Another object of my invention is to provide a simplified construction of bird and animal feeder which may be supported in one side of a wire enclosure forming a cage and swung outwardly through the side of the cage for filling or removal of a feeder pan which forms a part thereof.

Other and further objects of my invention will be understood from the specification hereinafter following by reference to the accompanying drawings, in which:

Figure 1 is a perspective view illustrating the feeder in position in one side of a wired cage; Fig. 2 is a view looking from the outside of the wired cage and showing the feeder in position in which the birds or animals have access to the feeder pan; Fig. 3 is a perspective view of the feeder looking from the inside of the wired cage where the feed trough has been swung to a position wholly inside of the enclosure to enable ready access to be had to the feeder pan; Fig. 4 is a view of the exterior of the wired cage showing the manner in which the support for the feeder trough is secured upon the wired cage with the feeder trough and pan removed; Fig. 5 is a perspective view of the feeder trough and pan carried thereby; Fig. 6 is a lateral cross-sectional view taken through the feeder on line 6—6 of Fig. 1; and Fig. 7 is a longitudinal cross-sectional view taken through the feeder on line 7—7 of Fig. 4.

I provide a simplified construction of caged animal feeder and waterer which may be made of iron, tin, galvanized iron, aluminum, or some other metal or suitable material. The feeder may be constructed in different sizes suitable for the feeding and watering of caged birds and animals. The construction of the feeder is such that it may be readily attached to a fence, partition, or wired enclosure in which the birds or animals are confined.

One of the features of my invention is the construction of a feed or water pan carrier of a semi-circular formation in such manner that the feed pan may be swung through an arc from a position wholly inside of the wired cage to a position entirely outside thereof for the removal of the feed or water pan for cleaning and refilling. There are a number of advantages accruing from the construction of the feeder or waterer of my invention, among which might be mentioned the fact that the attendant does not need to enter the pen for feeding or watering the birds or animals, which in the case of ferocious or wild animals avoids personal danger to the attendant. It is also desirable in feeding sick animals that the caretaker does not have to enter the pen to feed and water the animals, thus eliminating the danger of carrying disease. The feeding and watering can be accomplished in a small fraction of time by the use of the feeder constructed in accordance with my invention as compared with the time required in feeding and watering with constructions heretofore available. The mounting of the feeder on one side of the wired cage enables the feeder to be placed at a sufficiently high elevation to avoid contamination of the food.

Referring to the drawings in more detail, the feeder or waterer is shown mounted on the inside of a wired enclosure 1 by means of two plate members 2 and 3 which extend parallel to each other, one on one side of the wired enclosure and the other on the opposite side thereof, and secured together by means of bolt members 4. The plate members 2 and 3 support shelf-like portions 5 and 6 extending laterally with respect to the plates 2 and 3, one shelf-like member 5 protruding outside of the wired cage 1, and the other shelf-like member 6 extending inside of the wired cage 1. The shelf-like members 5 and 6 are secured to the plates 2 and 3 by means of suitable bolts or fastening means 7. The shelf-like members form an extended horizontal support over which a semi-circular pan 8 is arranged to be swung. The semi-circular pan 8 is provided at the center of its rear diametrical wall with a strap member 9 through which a pivot pin 10 journaled at 11 between plates 2 and 3 is arranged to be passed. The pivot pin 10 is readily insertable into the strap portion 9 on the pan 8 or may be removed therefrom to enable the pan 8 to be entirely removed from the feeder structure or swung through the wired enclosure, as shown in Fig. 3, to a position outside of the wired enclosure as shown in Fig. 2. The semi-circular carrier 8 provides a support for the feeder or watering pan 14 which is telescoped within the carrier 8 and which may be readily removed for cleaning or renewal of food or water. The outside diametrical end wall of the carrier 8 is provided with a latch member 15 having a handle extension 16, the latch member being guided by a strap 17. The latch member locks behind a retaining member 18 secured to the outside plate 2, enabling the semi-circular carrier to be locked within the wired enclosure for the prevention of escape of birds or animals within the enclosure. By raising the handle 16 of the latch 15 the latch is moved to a position beyond the retaining member 18, permitting the semi-circular pan to be swung outwardly through the apertures 12, and then by withdrawl of pin 10 the semi-circular carrier may be entirely removed from the caged enclosure and the pan 14 taken out for cleaning and refilling. Suitable drain apertures 19 may be provided in the bottom of carrier 8. Openings 20 may be provided in the plate member 2 and 3 to permit the filling of the pan 14 with food or water from a position outside of the wired enclosure without withdrawing the pan 14 from the enclosure. A guide lip 21 may be pressed from one of the plates for directing food or water into the pan 14.

It will be observed that the feeder may be mounted in any selected postion with respect to the wired enclosure at a suitable elevation above the ground or floor to keep the feeder in a sanitary condition free from contamination. In the case of freezing of food or water the feeder pan 14 is readily removed.

While I have described my invention in certain preferred embodiments I desire that it be understood that modifications in the construction and arrangement of parts may be made and that no limitations upon my invention are intended other than are imposed by the scope of the appended claims.

What I claim as new and desire to secure by Letters Patent of the United States is as follows:

1. A feeder or waterer for birds and animals comprising in combination with an enclosure a pair of plate members arranged to be secured on opposite sides of said enclosure, a pair of shelf members projecting laterally from each of said plate members, and a semi-circular feed pan carrier pivotally mounted in said plate members and adapted to be supported on said shelf members, said plate members being apertured in such manner that said semi-circular carrier may be moved from a position wholly inside of said enclosure to a position outside of said enclosure.

2. A feeder or waterer comprising in combination with an enclosure a pair of vertical plate members arranged to be secured on opposite sides of said enclosures, a laterally extending shelf member secured to each of said plate members, a semi-circular carrier, said plate members being apertured immediately above said shelf members to permit the passage of said semi-circular carrier therethrough, said semi-circular carrier being pivotally mounted in said plate members whereby said carrier may be moved from a position wholly within said enclosure to a position wholly outside of said enclosure.

3. A feeder comprising in combination with an enclosure a pair of vertically extending plate members arranged to be secured on opposite sides of said enclosure, a laterally protruding shelf member carried by each of said plate members, a semi-circular carrier, said plate members being apertured to permit the passage of said semi-circular carrier therethrough, said carrier being pivotally mounted in said plate members and arranged to be alternately supported by said shelf members when in a position wholly within said enclosure or in a position outside of said enclosure.

4. A feeder or waterer comprising in combination with an enclosure a pair of vertically extending plate members arranged to be secured on opposite sides of said enclosure, a laterally extending shelf member carried by each of said plate members, said shelf members protruding in opposite directions, a semi-circular carrier, means for pivotally mounting said semi-circular carrier along a diametrical wall thereof in said plate members whereby said semi-circular carrier may be moved from a position wholly inside of said enclosure where it is supported by one of said shelf members to a position wholly outside of said enclosure where it is supported by the other of said shelf members.

5. A feeder or waterer comprising in combination with an enclosure a pair of vertical plate members arranged to be secured on opposite sides of said enclosure, a laterally protruding shelf member carried by each of said plate members, a semi-circular carrier arranged to be passed through apertures in said plate members to a position of support upon one or the other of said shelf members, and a removable pivot pin arranged to be positioned in said plate members and passed through the center of the diametrical wall of said semi-circular carrier for retaining said carrier in position on one or the other of said shelf members.

6. In a feeder or waterer the combination with an enclosure of a pair of vertically extended plate members arranged to be secured on opposite sides of said enclosure, a shelf member secured to each of said plate members and protruding in opposite directions, a semi-circular carrier having members in the diametrical wall thereof for engaging a pivotal mounting carried by said plate members, said plate members being apertured for a distance equal to the radius of said semi-circular carrier whereby said semi-circular carrier may be moved from a position wholly within said enclosure to a position wholly without said enclosure and supported alternately by said shelf members, and means for locking said carrier in a position inside of said inclosure.

In testimony whereof I affix my signature.

WALTER S. CUSTER.